United States Patent [19]

Onoda et al.

[11] 4,020,689
[45] May 3, 1977

[54] FLOW METER

[75] Inventors: Hajime Onoda, Tokyo; Hiroshi Watanabe, Urawa, both of Japan

[73] Assignee: Kimmon Manufacturing Co., Ltd., Tokyo, Japan

[22] Filed: Aug. 9, 1976

[21] Appl. No.: 712,543

[52] U.S. Cl. .................... 73/272 R; 310/75 A; 310/168
[51] Int. Cl.² ................ G01F 1/00; H02K 7/10
[58] Field of Search ............. 73/229–231, 73/253, 259, 260, 272; 310/75 A, 83, 168

[56] References Cited
UNITED STATES PATENTS

| | | | |
|---|---|---|---|
| 3,555,902 | 1/1971 | Onoda et al. | 73/229 |
| 3,599,022 | 8/1971 | Adair | 310/83 X |

*Primary Examiner*—Herbert Goldstein
*Attorney, Agent, or Firm*—Flynn & Frishauf

[57] ABSTRACT

A flow meter for measuring the consumption of a fluid such as tap water and indicating it digitally at a remote place from the detecting section, having a pulse generator; means for giving intermittent rotation to the rotor of the generator which comprises a cam plate with a dwell portion of the same radius and a plurality of recesses formed at the outer periphery thereof, a driving disc placed coaxially therewith and capable of rotating relatively to the cam plate within a prescribed angle, and an intermittently-driven member provided with a plurality of projections capable of being engaged with said recesses at the outer periphery thereof correspondingly to the cam plate and connected to the rotor shaft of the pulse generator; and a pulse motor capable of operating the indicating wheels by using the pulse voltage from the pulse generator.

4 Claims, 6 Drawing Figures

FLOW METER

This invention relates to a flow meter capable of digitally indicating the consumption of a fluid at a remote place from the detecting section by means of a pulse generator without using any dry cells or commercial power sources.

The flow meter, provided with such a pulse generator, has no such various drawbacks that may be encountered in those with commercial power sources or dry cells. In a flow meter using a commercial power source, for instance, the switch may not fully be actuated or the contacts may be subject to burning, while, in a meter using a dry cell, additional personal expenses may be required for periodically replacing the dry cell and there are problems of the safety of the meter and of the elimination or reduction of labor for the maintenance and inspection thereof. The flow meters provided with pulse generators, however, have eliminated all these problems. Accordingly, such flow meters have widely been used of late.

Conventional flow meters using such a pulse generator include, for instance, those presented in U.S. Pat. No. 3,555,902. However, such kind of flow meters in the prior art including the above patent required to be further improved in some points; a magnetic count indicating mechanism has generally been employed in the section for digitally indicating the consumption of a fluid by utilizing the electrically pulses from the pulse generator. Therefore, the generator is required to be relatively large in size, necessitating a large-sized intermittent-movement conversion means for driving the magnetic core by converting the rotation energy from the detecting section into the intermittent rotation energy in order to give sufficient power to the rotary drive of the magnetic core of the generator.

In this kind of conventional flow meter of this kind, as illustrated in FIGS. 2 and 3 of the aforementioned U.S. Pat. No. 3,555,902, the intermittent-movement conversion means includes a continuously rotating cam member and a lever which engages with the cam member and rapidly reciprocatively rocks through a prescribed angle in accordance with the rotation of the cam member, being so constructed that the generator may be driven by the reciprocative rocking action of the lever. In such construction, however, it is impossible to minimize substantially the interval between the axles of the lever and the cam member, so that it has been difficult to miniaturize the intermittent-movement conversion means.

An object of this invention is to provide a flow meter with a pulse generator which is made compact as a whole, capable of operating with less energy, low in manufacturing cost, and reliable in operating.

SUMMARY OF THE INVENTION

In order to attain this object, the present invention is characterized by providing a pulse motor placed between the indicating means for digitally indicating the consumption of a fluid and the generator, and a cam plate having a dwell portion of the same radius and cam grooves at the periphery thereof, and an intermittently-driven member having a plural number of projections capable of engaging the cam grooves of the cam plate.

BRIEF DESCRIPTION OF THE DRAWINGS

This invention can be more fully understood from the following detailed description when taken in conjunction with the accompanying drawings, in which.

DETAILED DESCRIPTION

Figure 1:
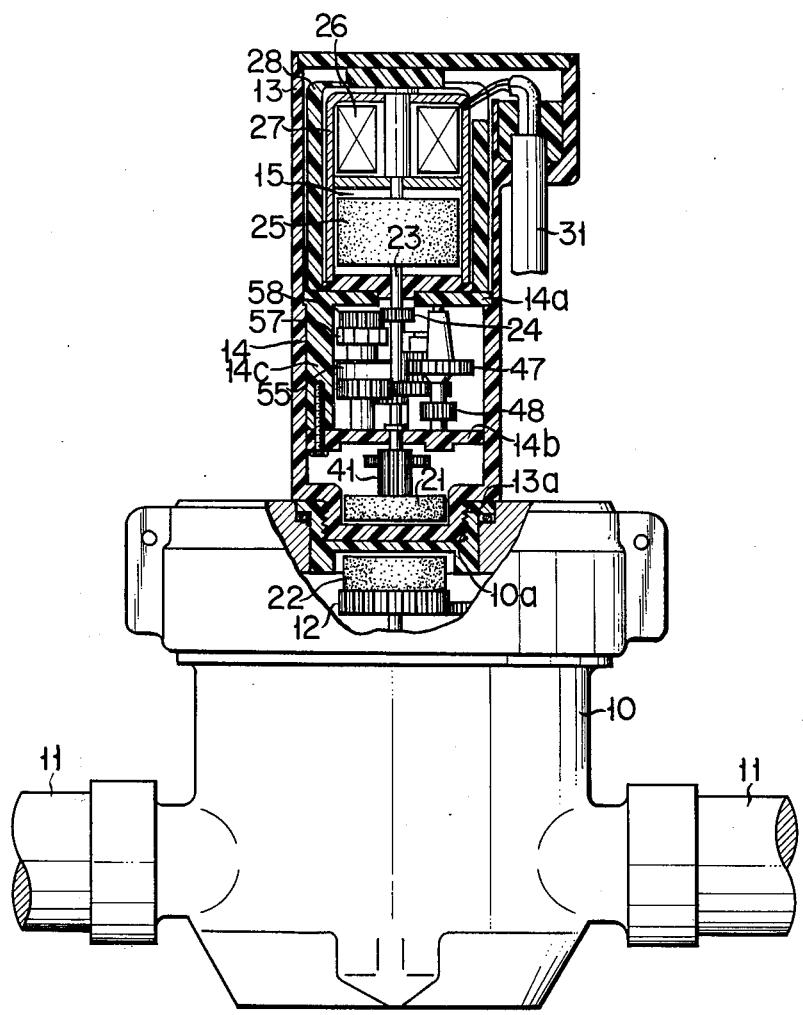
FIG. 1 is a partially broken side view of an embodiment of the flow meter of this invention, in which the part including the detecting section and the pulse generator is exposed.
Figure 2:
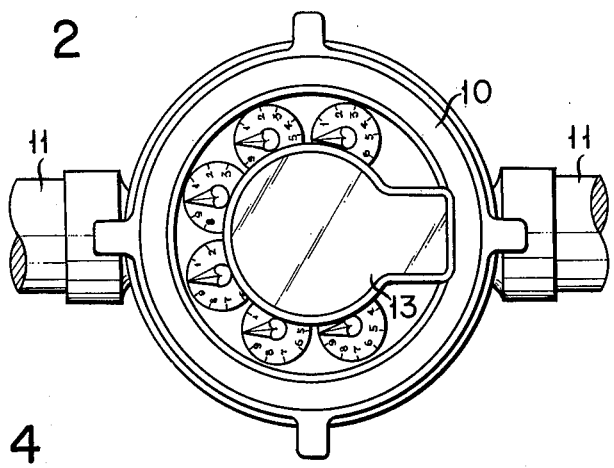
FIG. 2 is a top view on a reduced scale of the same flow meter as that of FIG. 1.

Referring now to FIG. 1, there is shown a flow meter of the invention suitable for measuring the consumption of tap water, wherein a water-proof detecting device 10 is connected to a water main pipe 11. The device 10 may be selected from well known those including those provided with runners (not shown) rotated by the flow of tap water. This device 10 dynamically converts the flow rate of a fluid into continuous rotation and transmits it to an output member 12. A substantially cylindrical plastic casing 13 is removably mounted on the device 10 with a male screw portion 13a formed at the bottom of the casing screwed into a female screw portion 10a formed on the device 10.

Figure 3:
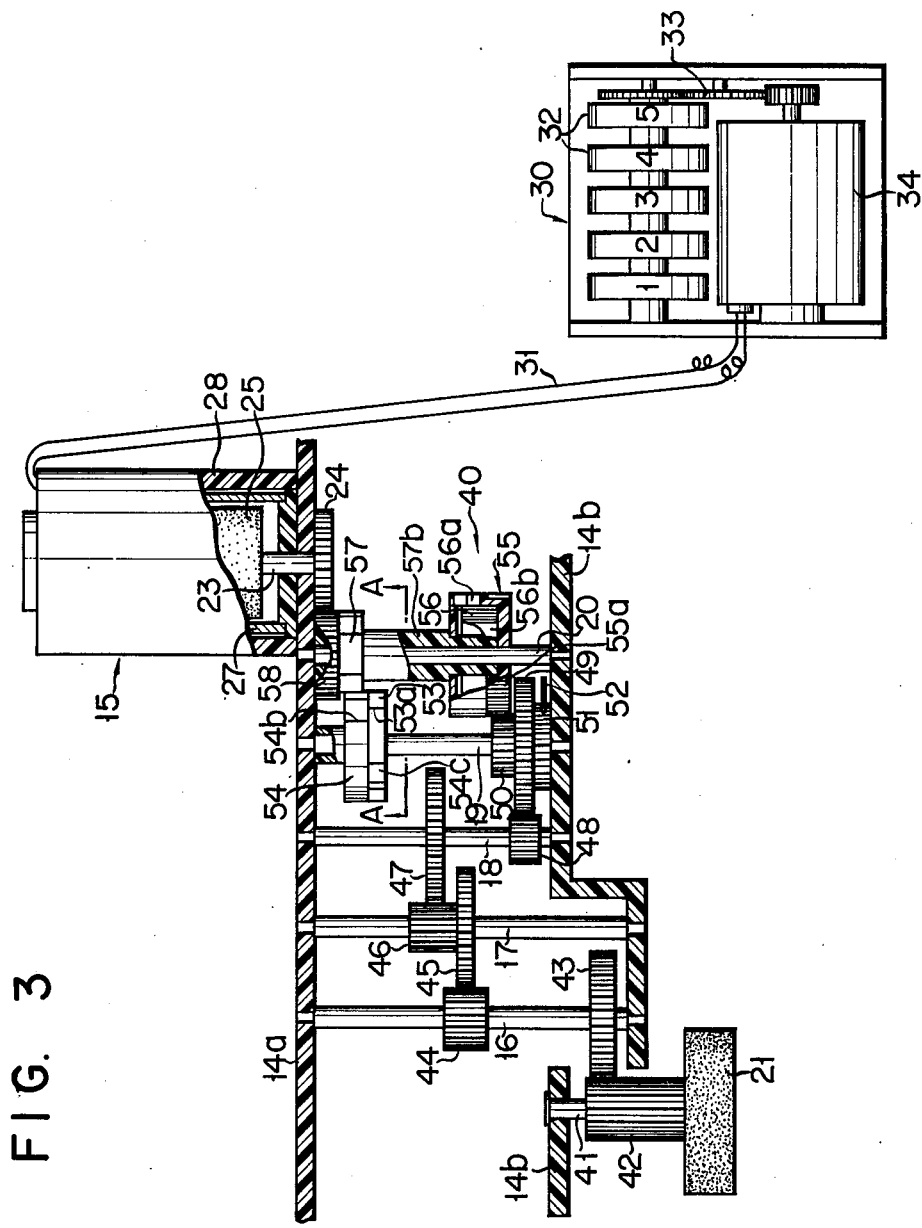
FIG. 3 is a diagrammatical side view of a flow meter according to the present invention.

A plastic frame 14 is supported at the lower half region within the casing 13, and a pulse generator 15 is placed in the upper half region. The frame 14 consists of an upper plate portion 14a substantially at the center of the casing 13, a lower plate portion 14b at the lower portion, and a plurality of vertical leg portions 14c (only one shown in the figure) interconnecting both these plate portions. Between these upper and lower plate portions 14a, 14b are supported 5 axles or shafts 16, 17, 18, 19 and 20 running parallel to one another in a vertical direction as shown in FIG. 3. The lower plate portion 14b supports a magnetic disc 21 as an input member, which corresponds to another magnetic disc 22 fixed on the output member 12 of the detecting device 10. Both magnetic discs 21, 22 constitutes a magnetic coupling, which is so constructed that the input member 21 is rotated in accordance with the rotation of the output member 12.

The said pulse generator 15, comprising a rotary shaft 23, a gear 24 fixed to the bottom thereof, a rotor 25 fixed to the same rotary shaft 23, a generation coil 26, an iron core 27, and a cap member 28 covering the aforementioned components, is made compact in the aggregate.

In FIG. 3, said pulse generator 15 is electrically connected to an indicating device 30 at a remote place by lead wires 31. The indicating device 30 is provided with a counting means composed of a series of indicating wheels 32, said counting means connected to a pulse motor 34 as a means for electrical-mechanical conversion through an intermediate gear 33. Thus, when electrical driving pulses are emitted from the pulse generator 15, the pulse motor 34 is actuated through the lead wires 31, thereby rotating the motor shaft through a prescribed angle. Then the rotation of the motor shaft is transmitted to the indicating wheels 32 through the intermediate gear 33, digitally indicating the consumption of a fluid.

Referring specially to FIG. 3, there will now be described an intermittent-movement conversion means 40 for driving the pulse generator 15. The aforesaid magnetic disc 21 is fixed on a shaft 41 supported at the lower plate porton 14b, while, at the same time, on such shaft 41 is also fixed a gear 42. The gear 42 constitutes a reduction gear mechanism together with a series of gears including those 43, 44 supported on the shaft 16, those 45, 46 supported on the shaft 17, and those 47, 48 supported on the shaft 19. Also on the shaft 19 is fixed a ratchet wheel 51 mated in an engaged manner with a pawl 52 for preventing reversing so as to allow the shaft 19 to rotate only in one direction.

Figure 4:
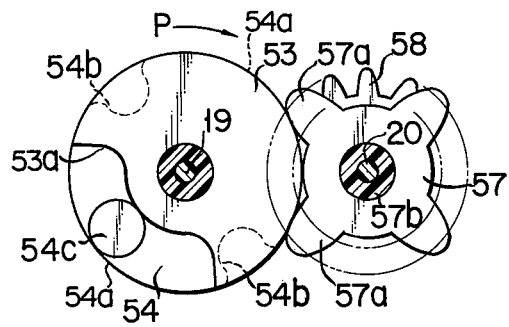
FIGS. 4 to 6 are diagrams viewed along line A—A of FIG. 3 in which the operative relationship between the cam plate and the intermittently-driven member of the flow meter according to the present invention is illustrated.
Figure 5:
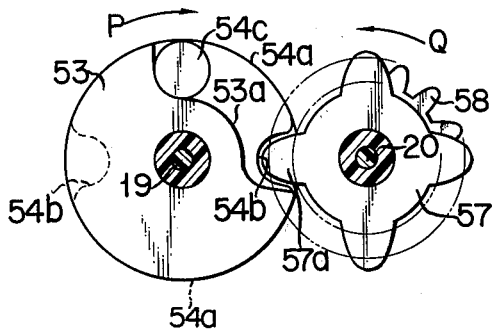
Figure 6:
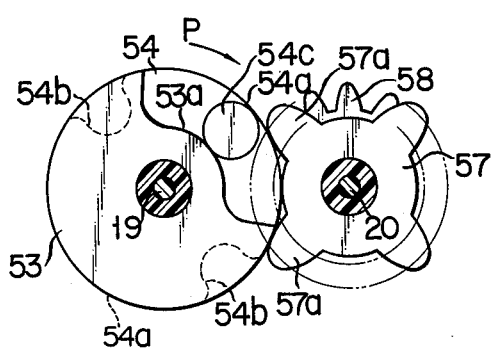

As shown on an enlarged scale in FIGS. 4 to 6, a driving disc 53 is fixed on the shaft 19. An arcuate recess 53a is formed at the periphery of the disc 53 over an angular range of about 120°. On the shaft 19 is supported a cam plate 54 capable of rotating thereon in a manner kept overlapped on the driving disc 53. The cam plate 54 has a dwell portion 54a of the same radius and diametrically opposite cam grooves 54b formed on the outer periphery thereof. A pin 54c is formed integrally with one side of the cam plate 54, protruding laterally therefrom and penetrating into the arcuate recess 53a of said driving disc 53. Accordingly, the cam plate 54 and the driving disc 53 are allowed to move rotatively in a relative manner only through a limited angle of about 90° according to the relationship between the arcuate groove 54b and the pin 54c.

Meanwhile, on a shaft 20 is rotatably supported a spring drum 55, whose gear 55a, formed on the outer periphery thereof, is engaged with the gear 50 of the reduction gear mechanism. Within the drum 55, a spiral spring 56 is so wound round the shaft 20 as to be in contact with the inner wall of the drum 55. The outer end 56a of the spiral spring 56 is attached to the drum 55, while the inner end 56b is attached to a boss 57b of an intermittently-driven member 57. The intermittently-driven member 57 has four projections 57a integrally formed on the outer periphery thereof so spaced as to provide an angle of 90° between each two adjacent projections, presenting the configuration of a gear as a whole. These projections 57a, as will be described hereinafter, are so shaped as to be engaged with the cam grooves 54b on the cam plate 54. The member 57, rotatably mounted on the shaft 20, is forced by the biasing force of the spring 56 to rotate only in one direction. Further, as shown in FIG. 4, the intermittently driven member 57 is usually so kept as to bring any two adjacent ones of the four projections 57a into contact with the dwell portion 54a of the cam plate 54 so that it may not be able to rotate.

The intermittently-driven member 57 has a gear 58 which is provided integral therewith and engaged the gear 58 and serves as an output member.

There will now be described the operation of a flow meter with the aforementioned construction in accordance with the present invention.

The flow rate of tap water is picked up by the detecting device 10 as a continuous rotation of the output member 12. The rotation is directly transmitted to the input member 21 by the magnetic coupling between the magnetic discs 22 and 21. The rotation of the input member 21 is reduced by the reduction gear mechanism and transmitted to the driving disc 53 and the spring drum 55. Then the driving disc 53 rotates clockwise as indicated by the arrow P in FIG. 4 in accordance with the rotation of the shaft 19. After one end of the arcuate recess 53a gets engaged with the pin 54c of the cam plate 54, the cam plate 54 is also rotated clockwise together with the disc 53. On the other hand, by the rotation of the spring drum 55, there is accumulated in the spiral spring 56 the biasing energy to rotate the driven member 57 counterclockwise as shown in FIG. 4. However, the member 57 may not be able to rotate while it is engaged with the dwell portion 54a of the cam plate 54. When one of the cam grooves 54b on the cam plate 54 reaches one of the projections 57a on the member 57, the projection 57a rapidly falls into the corresponding cam groove 54b as shown in FIG. 5 by means of the biasing force fully accumulated counterclockwise about the member 57 by the spring 56. The member 57 further rotates counterclockwise by the biasing force of the spring, and the cam plate 54 is rotated clockwise relatively to the driving disc 53 by the rotating force of the member 57. Consequently, the intermittently-driven member 57 comes again into contact with the dwell portion 54a of the cam plate 54, thereby stopping at the position where it has rotation counterclockwise through an angle of 90°. The rapid rotation of the driven member 57 during that time interval rotates the rotor 25 instantaneously through a prescribed angle (e.g., 90°) through the output gear 58, the gear 24, and the rotary shaft 23, so that electrical pulse voltage is generated by the pulse generator 15. The electrical pulse voltage is transmitted to the pulse motor 34 through the lead wires 31, thereby providing the rotary drive responding to one pulse at the indicating wheels 32.

In this embodiment, the flow meter is so constructed that each passage of 1 m³ of tap water rotates the intermittently-driven member 57 through an angle of 90° intermittently, generates one pulse from the pulse generator 15, and indicates 1 m³ of consumption of the fluid at the indicating wheels 32.

The flow meter according to the present invention uses the cam plate 54 and the intermittently-driven member 57 with special configuration, so that the interval between the shafts 19 and 20 may be minimized, and besides, the shafts 16, 17 and 18 for supporting other reduction gears may be allowed to be arranged around the said shafts 19 and 20 only requiring very narrow spacing. Since the rotor 25 of the pulse generator 15 of this invention is always intermittently rotatively driven only in one direction, the pulse motor 34 can constantly transmit the intermittent rotation in a fixed one direction to the indicating wheels 32 by means of the pulse voltage generated. Therefore, no complicated means for controlling forward or reverse rotation is required between the indicating wheels 32 and the pulse motor 34. Moreover, the driving of the pulse motor 34 requires a relatively small amount of energy, so that the pulse generator 15 may be miniaturized. Thus the pulse generator 15 and the intermittent-movement conversion means 40 may be contained wholly in a single small cylindrical casing 13, providing an advantage of being able to removably mount the casing 13 as a single unit on the detecting device 10.

What we claim is:

1. A flow meter comprising a flow-rate detecting means for dynamically converting the flow rate of a fluid to be measured into a continuous rotation, thereby continuously rotating an output member; an intermittent-movement conversion means including a reduction gear mechanism and arranged close to said detecting means so as to rotate an output member of the conversion means rapidly and intermittently each time the rotation of an input member of the conversion means continuously rotating in response to the rotation of the output member of said detecting means attains a prescribed degree; a pulse generator including a rotor rapidly rotatively driven by the output member of said conversion means and a generation coil generating driving pulses in response to the intermittent rotation of the output member of said conversion means and arranged close to said conversion means; and an indicating device for digitally indicating the consumption of a fluid, having a counting means including a series of indicating wheels and an electrical-mechanical conversion means for operating said counting means by means of driving pulses from said pulse generator and arranged at a remote place from said pulse generator; said intermittent-movement conversion means comprising a driving disc capable of continuously rotating at a speed reduced by means of said reduction gear mechanism in accordance with the rotation of the input member, a cam plate capable of rotating relatively to and coaxially with said driving disc through a prescribed angular range, said cam plate having a dwell portion and a plurality of cam grooves formed on the outer periphery thereof, said dwell portion having the same radius as said cam grooves, a spring drum rotating about an axle parallel to that of said driving disc, an intermittently-driven member arranged rotatably on the same axle as that of said drum, forced to rotate only in one direction in accordance with the rotation of said spring drum, and having a plurality of projections capable of being engaged with the cam grooves of said cam plate; said driven member being restrained by the dwell portion of said cam plate from rotating in opposition to the biasing force of said spring drum with the projections thereof not corresponding to the cam grooves of said cam plate, and rotated rapidly through a prescribed angular range by the biasing force of said spring drum with the projections thereof corresponding to the cam grooves in accordance with the rotation of the cam plate, thereby providing an intermittent rotary drive of the output member of said intermittent-movement conversion means; said electrical-mechanical conversion means including a pulse motor.

2. A flow meter according to claim 1 wherein said driving disc has an arcuate recess peripherally notched through a prescribed angle on the outer periphery thereof, said cam plate has a pin laterally protruding on one side thereof and penetrating into said arcuate recess, and the relative angle of rotation between the driving disc and the cam plate is defined by said pin and arcuate recess.

3. A flow meter according to claim 1 wherein the cam grooves of said cam plate are formed into a diametrically opposite pair, and the projections of said intermittently-driven member are four in number and so arranged as to provide an angle of 90° between each two adjacent ones about the center.

4. A flow meter according to claim 1 wherein said intermittent-movement conversion means and said pulse generator are contained in a substantially cylindrical casing, said casing being removably mounted on said flow-rate detecting means as a single unit.

* * * * *